(12) United States Patent
Rues et al.

(10) Patent No.: US 9,712,022 B2
(45) Date of Patent: Jul. 18, 2017

(54) USE OF AN INVOLUTE SHAPED HOUSING SURROUNDING SHAFT(S) TO PROMOTE SHAFT ANNULUS FLUID FLOW

(71) Applicant: GM GLOBAL TECHNOLOGY OPERATIONS LLC, Detroit, MI (US)

(72) Inventors: Nathan G. Rues, Fishers, IN (US); Konkipudi Talupulabbai, Bangalore (IN); Shachindra Dongaonkar, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 380 days.

(21) Appl. No.: 14/445,497

(22) Filed: Jul. 29, 2014

(65) Prior Publication Data
US 2016/0036297 A1 Feb. 4, 2016

(51) Int. Cl.
*H02K 7/10* (2006.01)
*H02K 9/19* (2006.01)
*H02K 5/20* (2006.01)

(52) U.S. Cl.
CPC .................. *H02K 9/19* (2013.01); *H02K 5/20* (2013.01)

(58) Field of Classification Search
CPC ........................................................ H02K 9/19
USPC ................................ 310/75 R, 52, 54, 58, 64
See application file for complete search history.

(56) References Cited

U.S. PATENT DOCUMENTS

| | | | | |
|---|---|---|---|---|
| 8,928,195 | B2* | 1/2015 | Ohashi | H02K 1/32 310/54 |
| 2004/0145252 | A1* | 7/2004 | Arimitsu | B60K 6/445 310/58 |
| 2009/0127954 | A1* | 5/2009 | Mogi | B60K 17/12 310/90 |
| 2011/0011124 | A1* | 1/2011 | Matsuura | C09K 5/045 62/468 |

* cited by examiner

Primary Examiner — Hanh Nguyen
(74) Attorney, Agent, or Firm — Quinn IP Law

(57) ABSTRACT

The powertrain includes a sump and an electric motor-generator configured to convert electrical energy into mechanical energy. The electric motor-generator includes a stator and a rotor. The rotor includes a rotor shaft and is configured to rotate about a shaft axis relative to the stator. The powertrain further includes an output shaft rotatable about the shaft axis and extending through the rotor shaft along the shaft axis. The output shaft and the rotor shaft jointly define a substantially annular gap therebetween. The electric motor-generator also includes a motor housing covering the stator and the rotor. The motor housing defines a housing passageway in fluid communication with the sump and the substantially annular gap. The housing passageway includes a substantially involute shaped portion in order to facilitate flow of the cooling fluid from the sump to the substantially annular gap.

20 Claims, 2 Drawing Sheets

USE OF AN INVOLUTE SHAPED HOUSING SURROUNDING SHAFT(S) TO PROMOTE SHAFT ANNULUS FLUID FLOW

TECHNICAL FIELD

The present disclosure relates to an electric motor-generator and a powertrain including an electric motor-generator.

BACKGROUND

Some vehicles include a powertrain having an electric motor-generator for propulsion. During operation, the electric motor-generator converts electrical energy into mechanical energy in the form of torque. The torque generated by the electric motor-generator can be used to propel the vehicle.

SUMMARY

During operation of an electric motor-generator, a rotor rotates relative to the stator. As a consequence of electromagnetic losses in stator and rotor, heat is generated in the electric motor-generator. Thermal management of an electric motor-generator is very challenging. Stator winding insulation and rotor temperatures should be well within predetermined limits for an efficient and continuous motor-generator operation. It is useful to cool the electric motor-generator during its operation in order to maximize its efficiency. In a vehicle, for example, oil can be used to cool the rotor of the electric motor-generator. The oil may originate from the sump of a powertrain. It is therefore useful to transport the oil from the sump to the rotor in order to cool the electric motor-generator. To this end, the present disclosure describes a powertrain including a passageway that facilitates flow of cooling fluid, such as oil, from the sump to the rotor of the electric motor-generator without necessarily needing a pump.

In an embodiment, the powertrain includes a sump configured to hold a cooling fluid and an electric motor-generator configured to convert electrical energy into mechanical energy. The electric motor-generator includes a stator and a rotor at least partially disposed within the stator. The rotor includes a hollow rotor shaft and rotor core mounted on the shaft. The rotor core may include a stack of magnets. The rotor is configured to rotate about a shaft axis relative to the stator. The powertrain further includes an output shaft rotatable about the shaft axis and extending through the rotor shaft along the shaft axis. The output shaft and the rotor shaft jointly define a substantially annular gap therebetween. The electric motor-generator also includes a motor housing covering the stator and the rotor. The motor housing defines a housing passageway in fluid communication with the sump and the substantially annular gap in order to allow the cooling fluid to flow between the sump and the substantially annular gap through the housing passageway. The housing passageway includes a substantially involute shaped portion in order to facilitate flow of the cooling fluid from the sump to the substantially annular gap. The substantially involute shaped portion of the housing passageway enables direct use of output shaft rotational energy to facilitate cooling fluid flow in the rotor shaft. Furthermore, no modifications to the shaft are necessary to implement the involute shaped portion of the housing passageway. The housing passageway along with its involute shaped portions enable the use of gravity drive unit lubrication and cooling strategy. Moreover, because no pump is necessary to facilitate the cooling fluid flow into the rotor shaft, the space required for the powertrain is minimized, thereby facilitating packaging. The present disclosure also relates to an electric motor-generator with the features described above.

The above features and advantages and other features and advantages of the present teachings are readily apparent from the following detailed description of the best modes for carrying out the teachings when taken in connection with the accompanying drawings.

DETAILED DESCRIPTION

Figure 1:
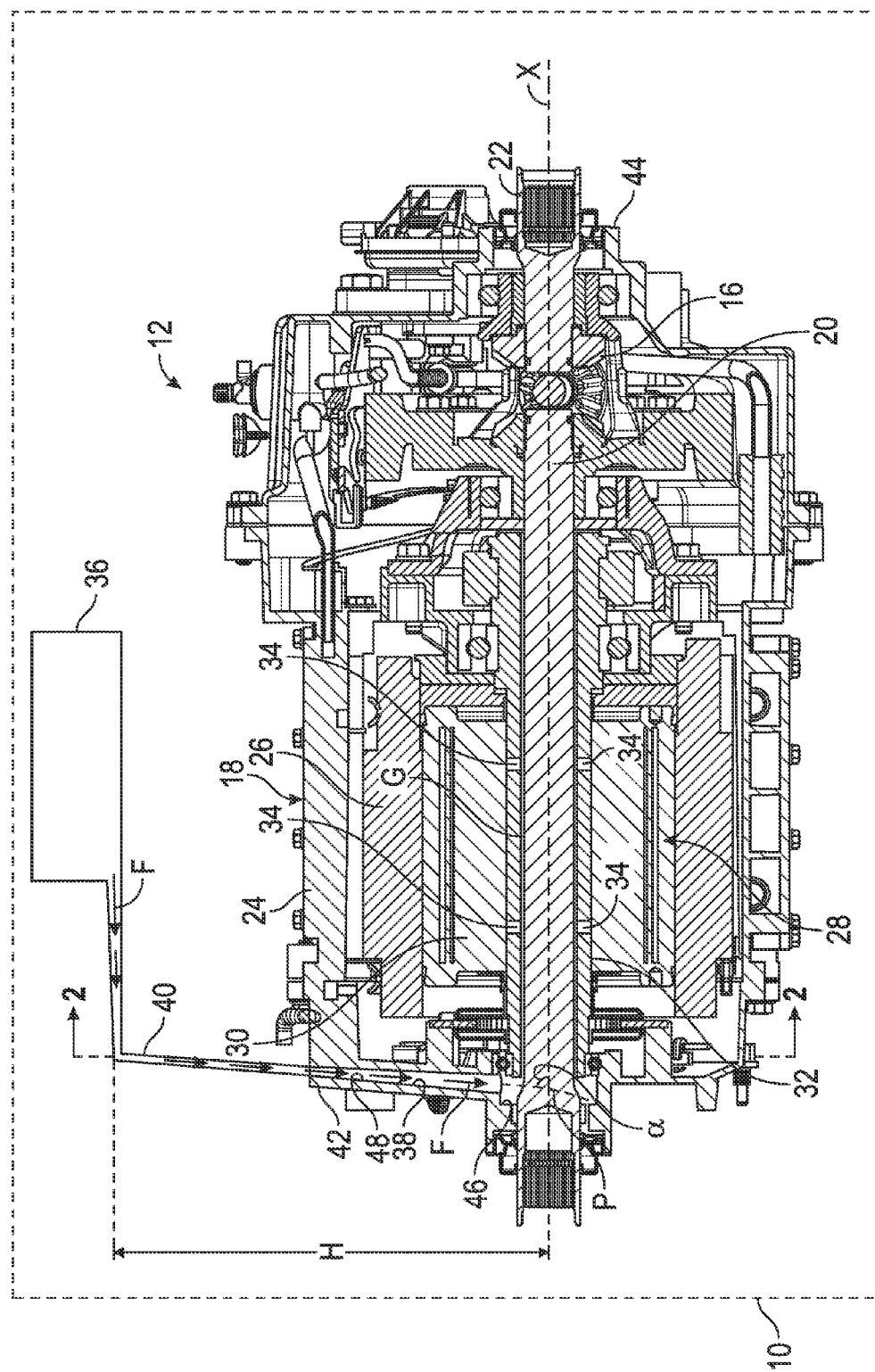
FIG. 1 is a schematic, cross-sectional side view of a powertrain including an electric motor-generator, gears, and a differential.

Referring to the drawings in which like elements are identified with identical numerals throughout, FIG. 1 schematically illustrates a powertrain 12 including a differential 16 and an electric motor-generator 18. The powertrain 12 may be part of a vehicle 10. As non-limiting examples, the vehicle 10 may be a car, truck, motorcycle, boat, or any other suitable motor vehicle. Regardless, the powertrain 12 can propel the vehicle 10.

The powertrain 12 includes output shafts 20 and 22 operatively coupled to the axle (not shown) that are coupled to the wheels (not shown). The output shafts 20 and 22 may also be referred to as the axle shafts and extend along the shaft axis X. During operation of the powertrain 12, the output shaft 20 can rotate about the shaft axis X in order to transmit torque to the differential 16. The differential 16 is operatively coupled to a rotor shaft 32 through a gear ratio. Therefore, torque can be transmitted from the rotor shaft 32 to the output shafts 20 and 22 through the differential 16.

The electric motor-generator 18 can convert electrical energy into mechanical energy and includes a motor housing 24, a stator 26 fixed to the motor housing 24, and a rotor 28 configured to rotate relative to the stator 26 about the shaft axis X. Because the stator 26 is fixed to the motor housing 24, the stator 26 remains substantially stationary relative to the motor housing 24. The rotor 28, on the other hand, can rotate relative to the stator 26 and the motor housing 24 about the shaft axis X. The motor housing 24 covers the stator 26 and the rotor 28.

The rotor 28 includes a rotor core 30 and a rotor shaft 32 coupled to the rotor core 30. During operation of the rotor 28, the rotor core 30 and the rotor shaft 32 rotate in unison. The rotor shaft 32 extends through the rotor core 30 along the shaft axis X and surrounds the entire perimeter (e.g., circumference) of the output shaft 20. In the depicted embodiment, the rotor shaft 32 is substantially hollow in order to allow the output shaft 20 to extend through the rotor shaft 32. Accordingly, the rotor shaft 32 defines an inner shaft cavity 35 extending along the shaft axis X. The output shaft 20 and the rotor shaft 32 define a substantially annular gap G between them. As discussed in detail below, the gap G is substantially annular in order to facilitate flow of a cooling fluid F, such as oil, around the output shaft 20 and through the rotor shaft 32. As a non-limiting example, the cooling fluid F may be automatic transmission fluid (ATF). The cooling fluid F passing through the rotor shaft 32 can cool down the rotor core 30. The rotor 28 further defines at least one opening 34 extending radially through the rotor shaft 32. The radially extending openings 34 may be substantially perpendicular to shaft axis X in order to allow the cooling fluid F flowing through the substantially annular gap G to exit and contact the rotor core 30 and stator 26, thereby cooling the rotor core 30 and stator 26. Although the depicted embodiment shows four radially extending openings 34, the rotor 28 may include more or fewer radially extending openings 34. Irrespective of the quantity or axial position, each radially extending opening 34 is in fluid communication with the substantially annular gap G and the inner shaft cavity 35.

The cooling fluid F originates from a sump 36 or any other container suitable for holding the cooling fluid F. The sump 36 can store and hold the cooling fluid F and is located at a position higher than shaft axis X. Specifically, the sump 36 is spaced from the shaft axis X by a predetermined height H that allows the cooling fluid F to flow from the sump 36 to the annular gap G without the aid of a pump or any other device capable of moving fluids. Consequently, gravity displaces the cooling fluid F from the sump 36 to the substantially annular gap G through the housing passageway 38. While the higher location of the sump 36 with respect to the shaft axis X helps displace the cooling fluid F to the annular gap G, the resistance to cooling fluid flow into the annular gap G increases with an increase in rotational speeds of the output shaft 20 and the rotor shaft 32. It is therefore useful to develop a mechanism to facilitate flow of cooling fluid F from the sump 36 to the annular gap G regardless of the rotational speeds of the output shaft 20 and the rotor shaft 32.

The motor housing 24 defines a housing passageway 38 in fluid communication with the sump 36 and the substantially annular gap G. The housing passageway 38 facilitates flow of the cooling fluid F between the sump 36 and the substantially annular gap G. Specifically, the housing passageway 38 facilitates flow of the cooling fluid F from the sump 36 to the annular gap G independently of the rotational speeds of the output shaft 20 and the rotor shaft 32 and without the aid of a pump or any other suitable device capable of displacing fluids. In the depicted embodiment, a sump passageway 40 fluidly couples the sump 36 to the housing passageway 38. The housing passageway 38 is closer to a first housing end 42 than a second housing end 44 of the motor housing 24. The first housing end 42 is opposite to the second housing end 44. The second housing end 44 is closer to the differential 16 than the first housing end 42.

Figure 2:
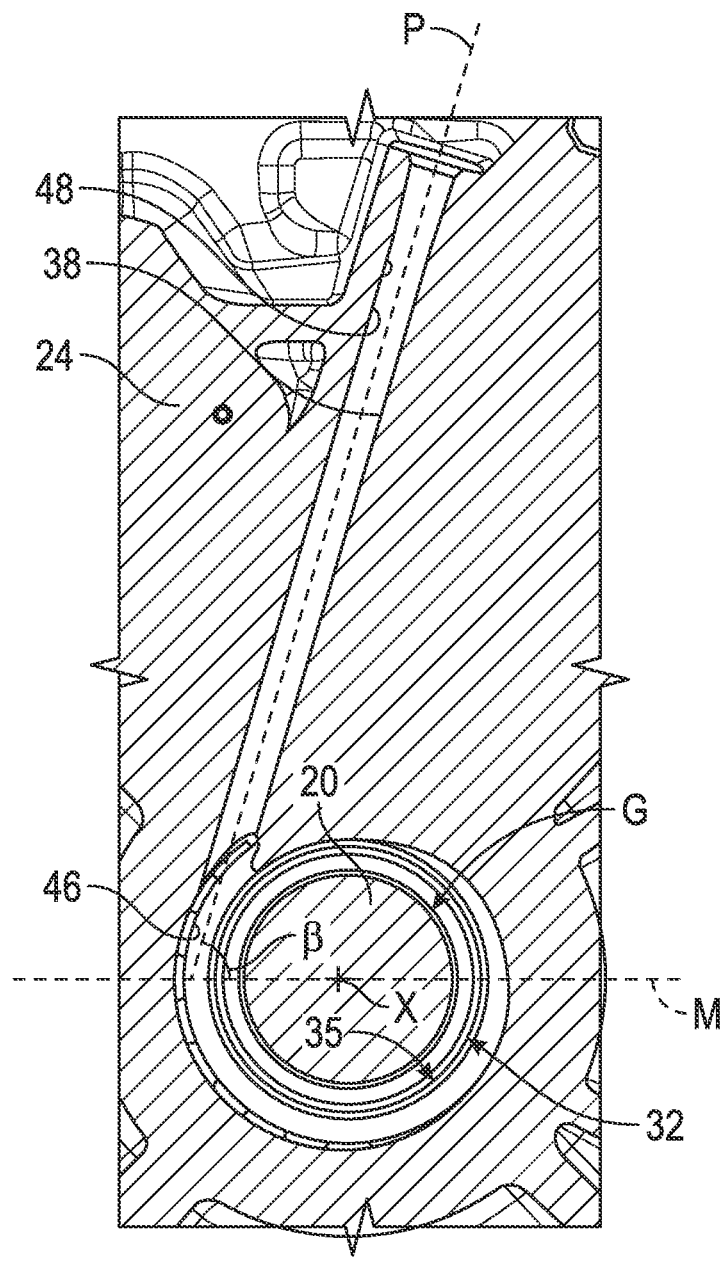
FIG. 2 is a schematic, cross-sectional front view of the electric motor-generator, taken along section line 2-2 of FIG. 1.

With reference to FIG. 2, the housing passageway 38 includes a connecting portion 48 in direct fluid communication with the sump passageway 40. In the depicted embodiment, the connecting portion 48 is substantially linear and extends along a passageway axis P. The passageway axis P may be obliquely angled relative to the shaft axis X (FIG. 1). In particular, the housing passageway axis P defines a first oblique angle α relative to the shaft axis X (FIG. 1). The first oblique angle α may range, for example, between 1 and 89 degrees in order to facilitate flow of cooling fluid F from the sump 36 to the substantially annular gap G. It is envisioned, however, that the connecting portion 48 of the housing passageway 38 may be substantially perpendicular to the shaft axis X (FIG. 1). The housing passageway axis P defined by the connecting portion 48 is also obliquely angled relative to a motor axis M that is perpendicular to the shaft axis X (FIG. 1). The motor axis M is a horizontal axis. The housing passageway axis P defines a second oblique angle β relative to the motor axis M. The second oblique angle β may range, for example, between 1 and 89 degrees in order to facilitate flow of cooling fluid F from the connecting portion 48 to a substantially annular gap G.

The housing passageway 38 further includes a substantially involute shaped portion 46 in direct fluid communication with the connecting portion 48. In the present disclosure, the term "involute" refers to a curve obtained from another given curve by attaching an imaginary taut string to a point on the given curve and tracing its free end as it is wound onto that given curve. For instance, the involute of a circle is a spiral. The substantially involute shaped portion 46 of the housing passageway 38 is in direct fluid communication with the substantially annular gap G. Therefore, the substantially involute shaped portion 46 interconnects the substantially annular gap G and the connecting portion 48, thereby allowing the cooling fluid F to flow between the connecting portion 48 and the substantially annular gap G. The substantially involute shaped portion 46 may be shaped as the involute of a circle. In such case, the substantially involute shaped portion 46 has a substantially spiral shape (FIG. 2). However, the substantially involute shaped portion 46 may be shaped as the involute of other curves. As non-limiting examples, the substantially involute shaped portion 46 may be shaped as a cardioid involute, a logarithmic spiral, or an ellipse involute, Archimedean spiral, Fibonacci spiral, a golden spiral, Nautilus spiral, an Euler spiral, Fermat's spiral, hyperbolic spiral, or the spiral of Theodorus. Regardless of the specific shape, the substantially involute shaped portion 46 is configured, shaped and sized to facilitate flow of cooling fluid F from the sump 36 (FIG. 1) to the substantially annular gap G without the aid of a pump or any other device capable of displacing fluids. Specifically, the shape of the substantially involute shaped portion 46 allows the rotation of the output shaft 20 to facilitate fluid flow into the substantially annular gap G. In the depicted embodiment, the substantially involute shaped portion 46 surrounds the entire output shaft 20 around the shaft axis X. Casting may be employed to manufacture the motor housing 24 with the substantially involute shaped portion 46. The substantially involute shaped portion 46 may also be referred to as the substantially involute cavity.

While the best modes for carrying out the teachings have been described in detail, those familiar with the art to which this disclosure relates will recognize various alternative designs and embodiments for practicing the teachings within the scope of the appended claims.

The invention claimed is:
1. A powertrain, comprising:
    a sump configured to hold a cooling fluid;
    an electric motor-generator configured to convert electrical energy into mechanical energy, wherein the electric motor-generator includes:
        a stator;
        a rotor at least partially disposed within the stator, wherein the rotor includes a rotor shaft and is configured to rotate about a shaft axis relative to the stator; and
        a motor housing covering the stator and the rotor;
    an output shaft rotatable about the shaft axis and extending through the rotor shaft along the shaft axis, wherein the output shaft and the rotor shaft jointly define an annular gap therebetween; and
    wherein the motor housing defines a housing passageway in fluid communication with the sump and the annular gap, and the housing passageway includes an involute shaped portion in order to facilitate flow of the cooling fluid from the sump to the annular gap.

2. The powertrain of claim 1, wherein the housing passageway includes a connecting portion in direct fluid communication with the involute shaped portion.

3. The powertrain of claim 2, wherein the involute shaped portion is in direct fluid communication with the annular gap.

4. The powertrain of claim 2, wherein the connecting portion is linear and is obliquely angled relative to the shaft axis.

5. The powertrain of claim 4, wherein the connecting portion is obliquely angled relative to a horizontal axis that is perpendicular to the shaft axis.

6. The powertrain of claim 1, wherein the involute shaped portion has a spiral shape.

7. The powertrain of claim 1, wherein the involute shaped portion surrounds an entirely of the output shaft around the shaft axis.

8. The powertrain of claim 1, wherein the sump is spaced apart from the shaft axis by a predetermined height such that gravity displaces the cooling fluid from the sump to the annular gap through the housing passageway.

9. The powertrain of claim 1, wherein the rotor includes a rotor core around the rotor shaft and defines at least one radially extending opening extending through the rotor shaft, and the at least one radially extending opening is in fluid communication with the annular gap in order to facilitate flow of the cooling fluid from the annular gap to the rotor core.

10. The powertrain of claim 9, wherein the at least one radially extending opening is perpendicular to the shaft axis.

11. The powertrain of claim 1, wherein the motor housing defines a first housing end and a second housing end opposite the first housing end, the second housing end is closer to a differential than the first housing end, and the housing passageway is closer to the first housing end than to the second housing end.

12. An electric motor-generator, comprising:
a stator;
a rotor at least partially disposed within the stator, wherein the rotor includes a rotor shaft and defines a inner shaft cavity extending through the rotor shaft;
a motor housing covering the stator and the rotor, wherein the motor housing defines a housing passageway in fluid communication with the inner shaft cavity in order to allow cooling fluid to flow into the inner shaft cavity; and
wherein the housing passageway includes an involute shaped portion in order to facilitate flow of the cooling fluid into the inner shaft cavity.

13. The electric motor-generator of claim 12, wherein the housing passageway includes a connecting portion in direct fluid communication with the involute shaped portion.

14. The electric motor-generator of claim 13, wherein the involute shaped portion is in direct fluid communication with the inner shaft cavity.

15. The electric motor-generator of claim 13, wherein the rotor shaft extends along a shaft axis, and the connecting portion is linear and is obliquely angled relative to the shaft axis.

16. The electric motor-generator of claim 15, wherein the connecting portion is obliquely angled relative to a horizontal axis that is perpendicular to the shaft axis.

17. The electric motor-generator of claim 12, wherein the involute shaped portion has a spiral shape.

18. The electric motor-generator of claim 12, wherein the rotor includes a rotor core around the rotor shaft and defines at least one radially extending opening extending through the rotor shaft, and the at least one radially extending opening is in fluid communication with the inner shaft cavity in order to facilitate flow of the cooling fluid from the inner shaft cavity to the rotor core.

19. The electric motor-generator of claim 18, wherein the at least one radially extending opening is perpendicular to a shaft axis defined along the rotor shaft.

20. The electric motor-generator of claim 12, wherein the motor housing defines a first housing end and a second housing end opposite the first housing end, and the housing passageway is closer to the first housing end than to the second housing end.

* * * * *